US011555624B1

(12) United States Patent
Schnase et al.

(10) Patent No.: US 11,555,624 B1
(45) Date of Patent: Jan. 17, 2023

(54) SYSTEM AND METHOD FOR PROVIDING AUTOMATED MULTI-SOURCE DATA PROVISIONING FOR A REANALYSIS ENSEMBLE SERVICE

(71) Applicant: United States of America as represented by the Administrator of NASA, Washington, DC (US)

(72) Inventors: John L. Schnase, Greenbelt, MD (US); Daniel Q. Duffy, Greenbelt, MD (US); Glenn S. Tamkin, Falls Church, VA (US); Jian Li, Falls Church, VA (US); Savannah L. Strong, Falls Church, VA (US); Roger Gill, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 483 days.

(21) Appl. No.: 16/730,365

(22) Filed: Dec. 30, 2019

Related U.S. Application Data

(63) Continuation-in-part of application No. 14/711,137, filed on May 13, 2015, now Pat. No. 10,339,114.

(51) Int. Cl.
*F24F 11/49* (2018.01)
*F24F 11/54* (2018.01)
(Continued)

(52) U.S. Cl.
CPC .............. *F24F 11/49* (2018.01); *F24F 11/54* (2018.01); *F24F 11/63* (2018.01); *G06F 9/541* (2013.01); *G06F 16/182* (2019.01)

(58) Field of Classification Search
CPC .. F24F 11/49; F24F 11/54; F24F 11/63; G06F 9/541; G06F 16/182
See application file for complete search history.

(56) References Cited

U.S. PATENT DOCUMENTS 8,607,154 B2 * 12/2013 Watts .................. G06F 3/04847
715/772
9,264,224 B2 * 2/2016 O'Hare ................ H04L 9/0861
(Continued)

*Primary Examiner* — Ramesh B Patel
(74) *Attorney, Agent, or Firm* — Christopher O. Edwards; Bryan A. Geurts; Helen M. Galus

(57) ABSTRACT

An extended reanalysis ensemble service includes a loader services application program interface configured to receive data parameters for a set of automated multisource data provisioning operations, provide climate source data from one or more disparate climate data collections specified in the data parameters to conversion utilities for transforming the climate source data into flat, serialized block compressed sequence files, and load the sequence files to a distributed file system of the extended reanalysis ensemble service, and a reanalysis ensemble service application program interface configured to receive operational parameters for the set of automated multisource data provisioning operations, convert the operational parameters to one or more methods recognized by a service interface of the extended reanalysis ensemble service to be converted to analytical operations executed by the extended reanalysis ensemble service, and provide results of the one or more analytical operations executed by the extended reanalysis ensemble service to a client.

12 Claims, 5 Drawing Sheets

(51) Int. Cl.
  *F24F 11/63* (2018.01)
  *G06F 16/182* (2019.01)
  *G06F 9/54* (2006.01)

(56) References Cited

U.S. PATENT DOCUMENTS

| | | | |
|---|---|---|---|
| 10,339,114 B2* | 7/2019 | Schnase | G06F 16/182 |
| 2003/0012431 A1* | 1/2003 | Irvine | G06T 9/005 |
| | | | 382/166 |
| 2013/0014046 A1* | 1/2013 | Watts | G06F 3/04817 |
| | | | 715/772 |
| 2014/0298012 A1* | 10/2014 | Orsini | H04L 63/10 |
| | | | 713/165 |
| 2015/0046532 A1* | 2/2015 | Szczytowski | H04L 67/104 |
| | | | 709/204 |
| 2016/0335291 A1* | 11/2016 | Schnase | G06F 16/182 |

* cited by examiner

SYSTEM AND METHOD FOR PROVIDING AUTOMATED MULTI-SOURCE DATA PROVISIONING FOR A REANALYSIS ENSEMBLE SERVICE

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefor.

ORIGIN OF THE INVENTION

Field

The present disclosure relates to climate data analytic services and more specifically to providing automatically updated climate data reanalyzes collected from multiple disparate climate data collections.

Background

There are a number of current climate data sources available that have been created by different climate and weather organizations. Some examples include NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CRv2c), Japanese 25-year Reanalysis (JRA-25), Japanese 55-year Reanalysis (JRA-55), data from NASA's Moderate Resolution Imaging Spectroradiometer (MODIS), LANDSAT image data, and NASA's Global Precipitation Climatology Project (GPCP) dataset.

The NASA Modern-Era Retrospective Analysis for Research and Applications (current version: MERRA-2) is a climate reanalysis dataset that integrates global data from a variety of satellite systems with numerical models to produce a temporally and spatially consistent synthesis of climate variables that are not easily observed. The MERRA-2 dataset spans from 1979 to the present and includes atmosphere, ocean, and land surface products.

The ERA-Interim dataset is a global atmospheric reanalysis that extends from 1979 provided by the European Centre for Medium-Range Weather Forecasts. Data products include a large variety of 3-hourly surface parameters, describing weather as well as ocean-wave and land-surface conditions, and 6-hourly upper-air parameters covering the troposphere and stratosphere.

The Climate Forecast System Reanalysis (CFSR) is a product of The National Centers for Environmental Prediction (NCEP) that spans from 1979 to the present. The CFSR was designed and executed as a global, high resolution, coupled atmosphere-ocean-land surface-sea ice system to provide estimates of the state of these coupled domains.

The 20th Century Reanalysis version 2 (20CRv2c) dataset includes global weather conditions and their uncertainty in six hour intervals from the year 1851 to 2012. Surface and sea level pressure observations are combined with a short-term forecast from an ensemble of 56 integrations of a National Centers for Environmental Prediction numerical weather prediction model using the Ensemble Kalman Filter technique to produce an estimate of the complete state of the atmosphere, and the uncertainty in that estimate.

Spanning from 1958 to the present, the combination JRA-25, JRA-55 is the longest third-generation reanalysis. Compared to the previous generation Japanese Meteorological Agency (JMA) reanalysis, JRA-25, JRA-55 uses a more advanced data assimilation scheme.

MODIS observes every point on Earth every 1-2 days in 36 discrete spectral bands using a 2,330-km-wide viewing swath, and measures among other things the frequency and distribution of cloud cover, the distribution and size of cloud droplets in both liquid water and ice clouds, and properties of aerosols in the atmosphere.

The Landsat program is a collection of spectral information from the Earth's surface using a camera system and a multi-spectral scanner accumulated since 1972.

NASA's Mesoscale Atmospheric Processes Laboratory produces the Global Precipitation Climatology Project (GPCP) monthly precipitation dataset from 1979-present by combining observations and satellite precipitation data into 2.5°×2.5° global grids.

A data analytics platform has been developed that provides a distributed file system for storing MERRA-2 datasets, and provides high performance operations for operating on the MERRA-2 datasets. The data analytics platform generally includes a sequencer that transforms the climate data, a desequencer that transforms serialized block compressed sequence files between data formats, a services library of applications that dynamically create data objects from the data as reduced final results, and a utilities library of software applications that process flat serialized block compressed sequence files. The data analytics platform also includes a service interface through which a client device can access the climate data via the data analytics platform.

SUMMARY

It would be advantageous to provide an extended capabilities Reanalysis Ensemble Service that automatically retrieves data from a combination of disparate data sources, aligns and sequences the data to a format serviceable by the Reanalysis Ensemble Service, initiates a specified set of analytics operations on the sequenced data by the Reanalysis Ensemble Service, and delivers the results to a requesting client. The extended capabilities Reanalysis Ensemble Service may include an application that may automatically perform the following operations: connect to one or more remote platforms storing disparate raw climate data; download the raw data from the remote platform to the Reanalysis Ensemble Service; sequence the data to a distributed file system of the Reanalysis Ensemble Service; validate that the data has been properly sequenced; perform a specified set of analytics operations on the sequenced data; deliver the results to the requesting client; and on demand, or on a scheduled basis, update the data from the combination of disparate data sources; and repeat the sequencing, validation, analytics, and delivery operations.

In at least one aspect, the disclosed embodiments are directed to an extended reanalysis ensemble service, including a loader services application program interface (API) configured to receive data parameters for a specified set of automated multisource data provisioning operations, provide climate source data from one or more disparate climate data collections specified in the data parameters to conversion utilities for transforming the climate source data into flat, serialized block compressed sequence files, and load the sequence files to a distributed file system of the extended reanalysis ensemble service, and a reanalysis ensemble service application program interface (API) configured to receive operational parameters for the specified set of automated multisource data provisioning operations, convert the operational parameters to one or more methods recognized by a service interface of the extended reanalysis ensemble service to be converted to analytical operations executed by the extended reanalysis ensemble service, and provide results of the one or more analytical operations executed by the extended reanalysis ensemble service to a client.

In at least one other aspect, the disclosed embodiments are directed to a method for providing an extended reanalysis ensemble service, including receiving data parameters for a specified set of automated multisource data provisioning operations, providing climate source data from one or more disparate climate data collections specified in the data parameters to conversion utilities and transforming the climate source data into flat, serialized block compressed sequence files, loading the sequence files to a distributed file system of the extended reanalysis ensemble service, receiving operational parameters for the specified set of automated multisource data provisioning operations, converting the operational parameters to one or more methods recognized by a service interface of the extended reanalysis ensemble service and converting the one or more methods to analytical operations executed by the extended reanalysis ensemble service, and providing results of the one or more analytical operations executed by the extended reanalysis ensemble service to a client.

In at least one further aspect, the disclosed embodiments are directed to a system for providing reanalysis ensemble services including a processor, a non-transitory computer readable storage medium storing instructions which when executed by the processor, cause the system to utilize a loader services API for receiving data parameters for a specified set of automated multisource data provisioning operations, providing climate source data from one or more disparate climate data collections specified in the data parameters to conversion utilities for transforming the climate source data into flat, serialized block compressed sequence files, and loading the sequence files to a distributed file system of the extended reanalysis ensemble service, and utilize a reanalysis ensemble service API for receiving operational parameters for the specified set of automated multisource data provisioning operations, converting the operational parameters to one or more methods recognized by a service interface of the extended reanalysis ensemble service to be converted to analytical operations executed by the extended reanalysis ensemble service, and providing results of the one or more analytical operations executed by the extended reanalysis ensemble service to a client.

DETAILED DESCRIPTION

Figure 1:
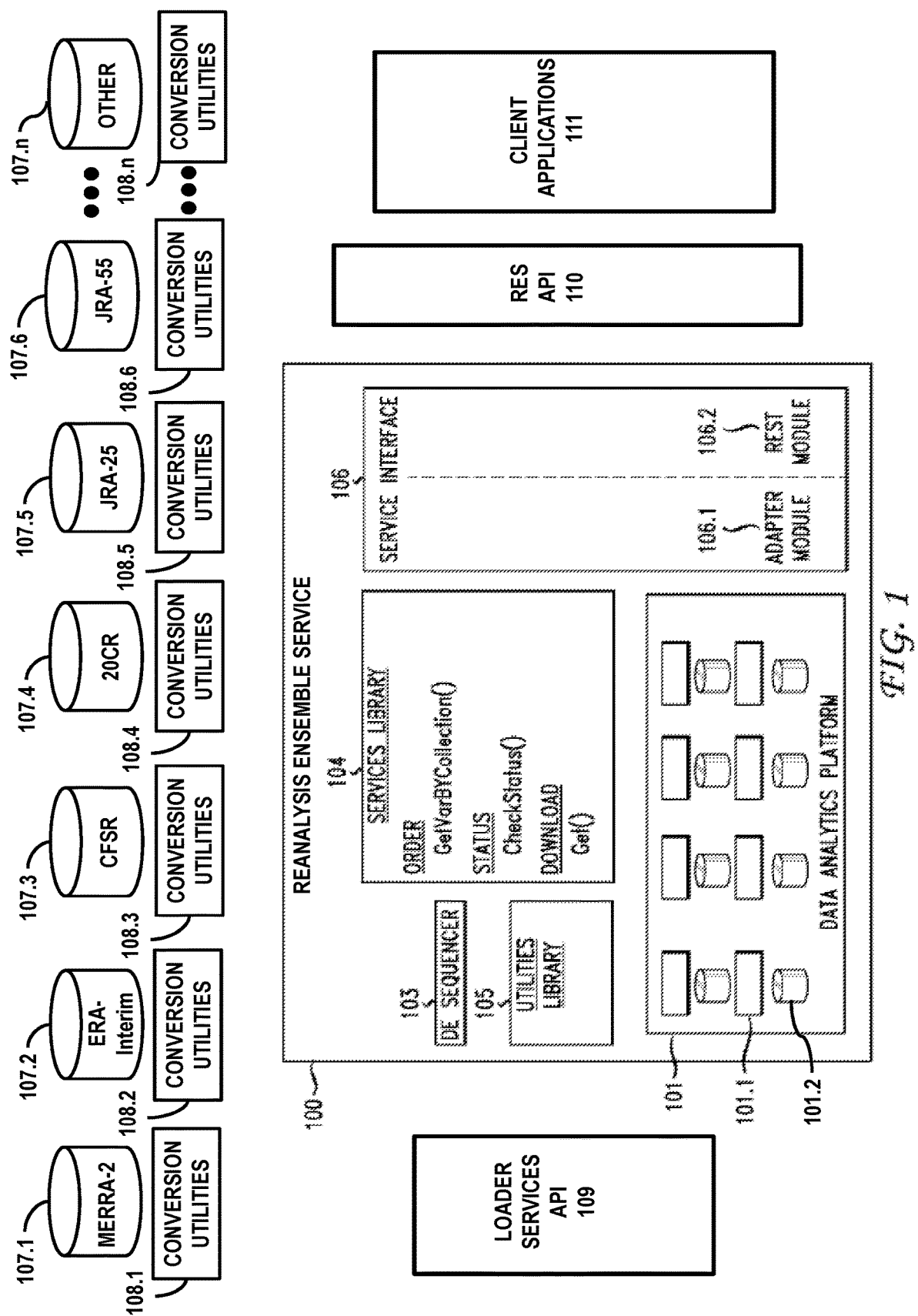
FIG. 1 shows a diagram off an example of an extended Reanalysis Ensemble Service.

In order to address current shortcomings in the art, a combination of technologies are disclosed herein to extend the capabilities of a Reanalysis Ensemble Service to include the ability to automatically collect data from a predetermined combination of disparate climate data sources, convert and align the data to a common format, perform a specified set of analytics operations on the common format data, and deliver the results to a requesting client. In addition, the Reanalysis Ensemble Service may be configured to update the data from the combination of disparate data sources; and repeat the sequencing, validation, specific analytics operations, and delivery operations on a periodic or scheduled basis.

In at least one embodiment, the extended Reanalysis Ensemble Service may be implemented as a Platform As A Service, that is, a cloud based service, packaged as containers that include code, libraries, and other required dependencies in standalone executable packages. The containers may implement a common packaging approach and typically operate in the same manner regardless of the host operating system or the underlying infrastructure. Docker® is an exemplary tool that may be used for creating, deploying, and running container based applications. The NASA General Application Platform (NGAP) is an exemplary cloud-based Platform-as-a-Service (PaaS) and Infrastructure-as-a-Service (IaaS) that may be suitable for providing the Reanalysis Ensemble Service. The NASA Advanced Data Analytics Platform (ADAPT) is another cloud-based PaaS and IaaS that may also be suitable for providing the Reanalysis Ensemble Service.

The disparate climate data sources may include one or more of the following in any combination: NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CRv2c), Japanese 25-year Reanalysis (JRA-25), Japanese 55-year Reanalysis (JRA-55), data from NASA's Moderate Resolution Imaging Spectroradiometer (MODIS), LANDSAT image data, NASA's Global Precipitation Climatology Project (GPCP) dataset, or any other suitable climate data source.

A system, method and computer-readable storage devices are disclosed which provide an extended Reanalysis Ensemble Service that automatically retrieves, aligns, and sequences data from a combination of data sources, and initiates a specified set of analytics operations on a scheduled, periodic or on demand basis.

The Reanalysis Ensemble service may generally include a data analytics platform of an assemblage of compute and storage nodes that provide a compute-storage fabric upon which high-performance parallel operations are performed over a collection of climate data stored in a distributed file system, a set of conversion routines that transform the climate data by converting it to a common format, align the data by temporal and spatial registration, and aggregate and transform the data into a sequence file output format. The system may include a services library of applications that dynamically create data objects from the data as reduced final results, and a utilities library of software applications that process flat serialized block compressed sequence files. The system may also include a Reanalysis Ensemble API through which a client device can request climate data analytical services via the data analytics platform.

The system may also include a loader services API that may automatically connect to one or more remote platforms storing disparate raw climate data, download the raw data from the one or more remote platforms, initiate sequencing the data to a distributed file system of the Reanalysis Ensemble Service, and validation that the data has been properly sequenced. The Reanalysis Ensemble Service may then perform a client requested set of analytics operations on the sequenced data; and deliver the results to the requesting client, on demand, or on a scheduled basis. The Reanalysis Ensemble Service described herein provides an exemplary embodiment of the concept of providing climate data analytics as a service using data from multiple climate data collections. Various modifications and changes may be made to the disclosed embodiments without departing from the broader spirit and scope of the disclosure. In particular, alternative analytic methods may be used as the basis for such a service, and the approach described here can apply to any number of suitable climate data collections.

FIG. 1 illustrates the overall organization of an exemplary system 100 for providing the Reanalysis Ensemble Service. The system 100 can include a high-performance data analytics platform 101, a desequencer 103, a services library 104, a utilities library 105, a service interface 106, source data from one or more climate data collections in any combination, 107.1-107.6, for example, MERRA-2, ERA-Interim, CFSR, 20CRv2c, JRA-25, JRA-55, MODIS, LANDSAT, and GPCP, a set of conversion utilities 108.1-108.6, a loader services API 109, and a Reanalysis Ensemble Service API 110 through which client applications 111 may request climate data analytical services.

The high-performance data analytics platform 101 can include data 101.1 originally sourced from the one or more of the climate data collections and can include one or more data storage devices 101.2. The high-performance data analytics platform 101 provides the storage and compute capabilities required to run the service. The Reanalysis Ensemble Service 100 can support parallel operations, for example, parallel operations utilizing MapReduce analytics; however, alternative configurations are possible so long as they enable high-performance, parallel computing over a distributed filesystem, for example, a Hadoop file system, and provide the software tools needed to support parallel operation code sets, for example, MapReduce code sets, that implement the capabilities of the system.

The high-performance data analytics platform 101 may be implemented using an open source Cloudera enterprise-ready distribution of the Apache Hadoop software application of a Hadoop file system and MapReduce engine, wherein Cloudera is integrated with configuration and administration tools and related open source software applications such as Hue, Oozi, Zookeeper, Hive, and Impala.

The desequencer 103 generally operates to transform the flat, serialized block compressed climate data collections sequence files stored in the distributed file system back into common format files and moves them out of the distributed file system for consumption by a calling program.

The services library 104 may include a plurality of software applications that dynamically create data objects from the data stored in the distributed file system. The services library 104 can be a set of Java classes which implement the capabilities of the services corresponding to the International Organization for Standards (ISO) Open Archival information System (OAIS) Reference Model data flow categories for an operational archive. Such capabilities include "ingest" capabilities to input data objects to the service, "query" capabilities that retrieve metadata relating to data objects in the service, "order" capabilities that dynamically creates data objects in the service, "download" capabilities that retrieve data objects from a service, "execute" capabilities that initiate service-definable operations, and "status" capabilities that check the progress of an order operation.

An exemplary order method may be a Get Variable By Collection (GetVarByCollection( . . . )) method that can implement a number of commonly-used canonical operations over one or more of the, MERRA-2, ERA-Interim, CFSR, 20CRv2c, JRA-25, JRA-55, MODIS, LANDSAT, and GPCP climate data collections. The arguments for the GetVarByCollection( . . . ) method may include one or more of the climate data collections upon which to operate, a temporal and three dimensional spatial extent, canonical operation to be performed, and any additional parameters needed by the operation.

Exemplary canonical operations may include, for example, maximum, minimum, sum, count, average, variance, and difference operations. Additional exemplary canonical operations that may be used over the one or more climate data collections may include:

Maxm2s—Seasonal maximum, meaning: converting monthly climate variable data to seasonal climate variable data (spring-March, April, May; summer-June, July, August; etc.), then selecting the maximum for selected variables for each grid of 30+ years. The output may include one time step, and a spatial extent as per a user request;

Avgm2s—Seasonal average, meaning: converting monthly climate variable data to seasonal climate variable data. Output contains multiple steps as time-span defined;

Vavg—Vertical average, meaning: averaging specified variables across a specified number of vertical levels;

Aavg—Spatial average, meaning: averaging specified variables over a specified spatial-extent;

Anomaly—In particular, time anomaly, meaning: a deviation of one or more variables at a certain time interval from an average of the one or more variables over a longer time interval;

Std—Standard deviation, a typical statistic measure to quantify the amount of variation of a set of data values;

The output of the GetVarByCollection( . . . ) method can include a unique session identifier for the order session that can be used to retrieve session status information and download results. The GetVarByCollection( . . . ) method may implement its operations using MapReduce, wherein mapper and reducer programs direct the parallel subsetting and execution of the operations over the climate collection data stored in the analytic platform's Hadoop filesystem. The Reanalysis Ensemble Service's status and download capabilities may be implemented by CheckStatus ( . . . ) and Get ( . . . ) methods provided by the services library 104. These methods can be used to check on the progress of a running order operation and download the computed results when the operation finishes. The services library 104 may be implemented as Java classes, however, it should be understood that any variety of alternative approaches may be used.

The utilities library 105 generally includes a plurality of software applications that can process the flat serialized block compressed sequence files. Several example software applications that can be included in the utilities library are provided herein. One example software application is a sorting application that sorts <key, value> pairs of the sequence files by time and grouped by a main variable field. Other example software applications can include a comparing application that compares variable name and associated timestamps of the <key, value> pairs, and sorts operations over the <key, value> pairs by comparing variable name and grouping variables by variable name, a partitioning application that partitions results from a mapper based on a variable name across a plurality of reducer applications, enabling parallel execution of the reducer applications, a simplifying application that simplifies sequencing and desequencing operations by abstracting operations on the <key, value> pairs from a main code of a MapReduce software application, and a managing application that manages configuration files required to execute MapReduce software applications.

The utilities library 105 may include an Anomaly Detection (AnomalyDetect( . . . )) method which may be effected using a Python application that may use a single library call to compute the anomaly results. The arguments for the AnomalyDetect( . . . ) method may include one or more climate measurements, one or more of the reanalysis collections upon which to operate, a multi-period temporal span, a specified period within the multi-period temporal span, and a specified sub-period at the same time within each of the periods, for example, June $21^{st}$ through September $23^{rd}$; i.e. summer.

The utilities library 105 may further include an Uncertainty Quantification (UncertQuant( . . . )) method effected using a Python application that may use a single library call to compute the anomaly results. The arguments for the UncertQuant( . . . ) method may include one or more climate measurements, one or more of the reanalysis collections upon which to operate, a multi-period temporal span, a specified period within the multi-period temporal span, and a specified sub-period at the same time within each of the periods, for example, June $21^{st}$ through September $23^{rd}$; i.e. summer.

Similar to the services library 104, the utilities library 105 may be implemented as Java classes, however, it should be understood that any variety of alternative approaches may be used.

The service interface 106 may provide a portal through which a client device can access the climate data collections 107.1-107.n via the services library 104. The service interface 106 can include an adapter module 106.1 that maps service requests from the client applications 111 to specific capabilities of the data analytics service, and a representational state transfer (REST) server module 106.2 that communicatively links the data analytics service to external client software applications. The adapter module 106.1 can be based on International Organization for Standardization (ISO) Open Archival Information System (OAIS) Reference Model categories and may communicate through ISO OAIS Reference Model-based uniform resource locators. In an exemplary embodiment, the RESTful interface 106.2 may be implemented as a PHP program.

The source data may generally originate from the disparate climate data collections, 107.1-107.n, for example, MERRA-2, ERA-Interim, CFSR, 20CRv2c, JRA-25, JRA-55, MODIS, LANDSAT, GPCP, and any other suitable climate dataset. The climate datasets are generally disparate in that they may have different formats, variables, geographical and spatial domains, temporal resolutions, and other differences.

The set of conversion utilities 108.1-108.n may each be configured to convert a specific one of the disparate climate data collections to common format files that are temporally and spatially registered, to transform the common format files into the flat, serialized block compressed sequence files required by the parallel operation programs, and to load the sequence files into the distributed file system. The climate datasets are generally disparate in that they may have different formats, variables, geographical and spatial domains, temporal resolutions, and other differences.

Figure 2:
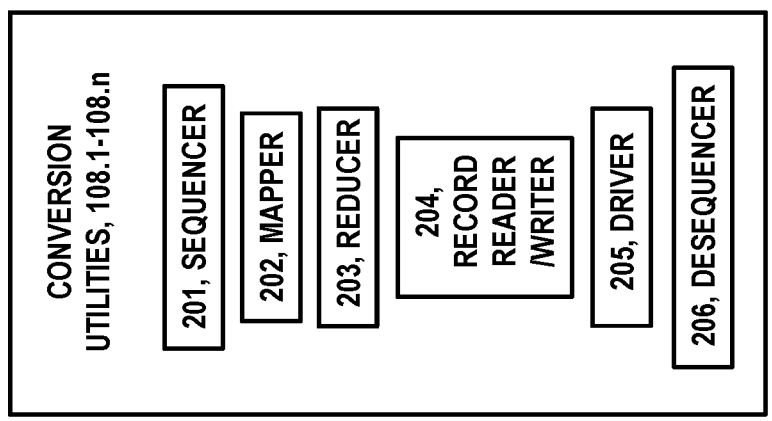
FIG. 2 illustrates individual sets of conversion utilities which may be utilized to convert source files of each climate data collection to flat, serialized block compressed sequence files.

As shown in FIG. 2, the individual conversion utilities may each include a sequencer utility 201 to temporally and spatially register the raw data and convert the raw data of each the disparate climate datasets to a MapReduce-consumable input format, a mapper class 202 to filter, temporally and spatially register, and combine input sequence records, a reducer class 203 to aggregate and transform filtered input records into sequence file output format, a record reader/writer utility 204 for HDFS input/output used by the mapper 202 and reducer 203, a driver class 205 to orchestrate the application at runtime, and a de-sequencer utility 206 to convert reduced sequence files to the proper output format (e.g., NetCDF).

The sequencer utility 201, mapper class 202, reducer class 203, record reader/writer utility 204, driver class 205, and de-sequencer utility 206 of each of the conversion utilities 108.1-108.6 may be configured to operate on a specific disparate dataset that may have a particular format, set of variables, different geographical and spatial domains, and temporal resolutions. The conversion utilities may be implemented as Java classes, however, it should be understood that any variety of alternative approaches may be used.

The system can create a single custom sequence file for each NetCDF file, wherein the source file's data are logically stored as <key, value> pairs within the resulting sequence file. As a result, each sequence file has a one-to-one mapping to the original NetCDF file. One benefit of this approach is that NetCDF metadata is preserved within the sequence file.

Returning to FIG. 1, the loader services API 109 may operate to connect to the climate data collections, 107.1-107.n, download data from the climate data collections, 107.1-107.n, cause the data to be sequenced, and validate that the data has been sequenced properly. The loader services API 109 may automatically collect data from a predetermined combination of the climate data sources, and submit the climate data to the conversion utilities for conversion, alignment to a common format, and sequencing. The loader services API 109 may be configured to update the data from the combination of disparate climate data sources; convert the updated data to the common format, and repeat the sequencing on a periodic or scheduled basis. The loader services API 109 may be configured from input directly from the client applications or from the Reanalysis Ensemble Service API 110, where the input may specify a predetermined combination of disparate climate data sources, a set of variables to retrieve, specified temporal and spatial ranges, and any other data that may be included in the disparate climate data collections.

The Reanalysis Ensemble Service API 110 generally provides an interface between client applications 111 and the Reanalysis Ensemble Service 100. The Reanalysis Ensemble Service API 110 may include an interface that connects to the client applications 111 and the Reanalysis Ensemble Service 100, and may also include a set of utilities that may process requests from the client applications 111 and return data to the client applications 111.

Figure 3:
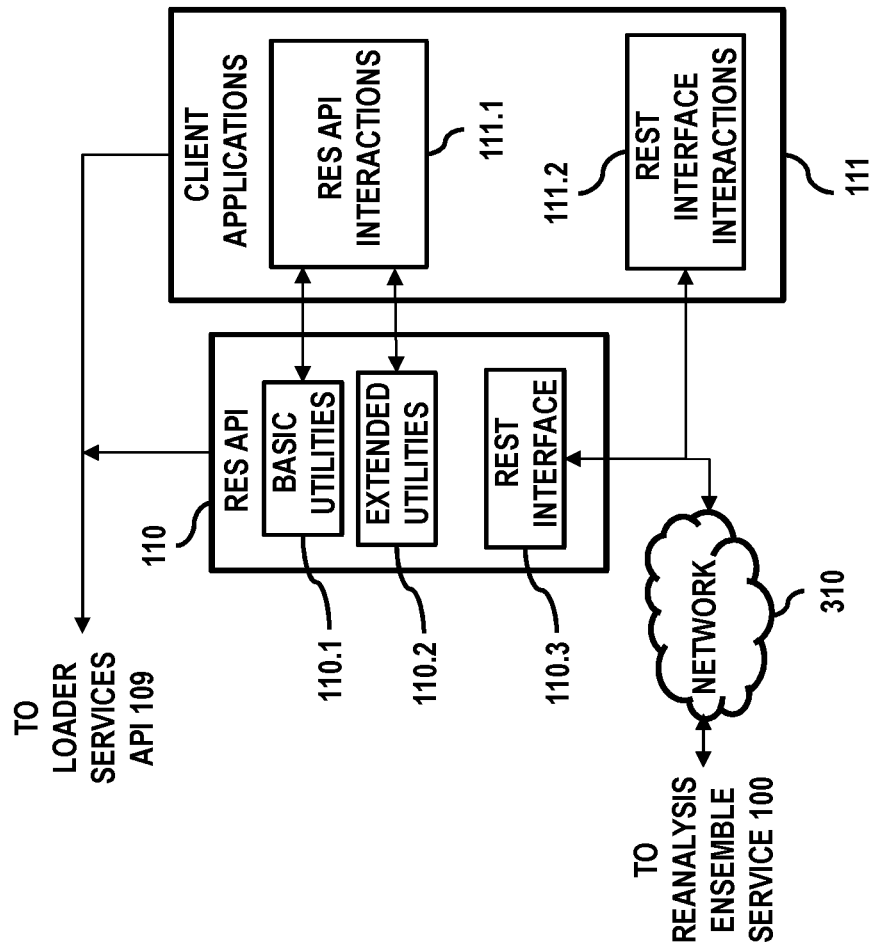
FIG. 3 illustrates an architecture of a Reanalysis Ensemble Service application programming interface (API) according to the disclosed embodiments.

FIG. 3 shows block diagrams of the Reanalysis Ensemble Service API 110 and the client applications 111. The Reanalysis Ensemble Service API 110 may include a RESTful communications interface 110.3 that connects the API 110 to the client applications 111 and to the RESt module 106.2 of the Reanalysis Ensemble Service 100 through a network 310. The Reanalysis Ensemble Service API 110 may further include a collection of basic utilities 110.1 and an optional set of extended utilities 110.2. The Reanalysis Ensemble Service API 110 generally operates to abstract inbound and outbound web service traffic into the functions provided by the Reanalysis Ensemble Service 100. The communications protocol implemented by the RESTful communications interface 110.3 and the functional organization of the utilities 110.1, 110.2, may be based on the OAIS Reference Model's data flow categories.

The basic utilities 110.1 may generally map calls from the client applications 111.1 to a single service-side method implemented by the Reanalysis Ensemble Service 100. In one or more embodiments, the basic utilities may correspond to the OAIS Reference Model data flow categories of an operational archive, having the form of a service name, a specified operation, and operational parameters, where the operational parameters include, among other things, which of the disparate climate data collections, for example, MERRA-2, ERA-Interim, CFSR, 20CRv2c, JRA-25, JRA-55, MODIS, LANDSAT, and GPCP, on which to operate, either individually or in combination.

The calls initiated by the client applications 111.1 may include, for example, the ingest, query, order, download, execute, and status methods discussed above, and the basic utilities 110.1 may have a one-to-one correspondence to the ingest, query, order, download, execute, and status web service calls recognized by the service interface 106. In particular, the client applications 111 may utilize the calls to establish automated multisource data provisioning operations according to the disclosed embodiments. The client applications may utilize the calls to identify data and operations for an automated client specified reanalysis study, for example, a set of variables to retrieve, a predetermined combination of disparate climate data sources, specified temporal and spatial ranges, operations to be performed on the retrieved data, a schedule for performing the study, and any other parameters that may be included as part of the automated client specified reanalysis study.

The client applications may send requests specifying data parameters for automated multisource data provisioning operations directly to the loader services API 109, or indirectly through the Reanalysis Ensemble Service API 110 to the loader services API 109. The data parameters may include one or more of a set of variables to retrieve, a predetermined combination of disparate climate data sources, specified temporal and spatial ranges, and any other suitable data parameters.

The client applications may send requests specifying operational parameters for automated multisource data provisioning operations to the Reanalysis Ensemble Service API 110. The operational parameters may include operations to be performed on the retrieved data, a schedule for performing the study, and any other suitable operational parameters.

The operations to be performed on the retrieved data may be implemented by the basic utilities 110.1 which may include the canonical operations: maximum, minimum, sum, count, average, variance, difference, seasonal maximum, seasonal average, vertical average, spatial average, time anomaly, standard deviation, and any canonical operations, the ingest, query, order, download, execute, and status methods, and any other operations, alone or in any combination.

The operations to be performed on the retrieved data may also be implemented by the extended utilities 110.2 which may include scripts or programs that combine a collection of utilities basic, extended, or both, the OAIS Reference Model web services, ingest, query, order, download, execute, and status, the above mentioned canonical operations individually or in combination, or any other combination of services provided by the Reanalysis Ensemble Service 100 to perform a specific task or create higher order products.

The Reanalysis Ensemble Service API 110 may convert the requested operational parameters to routines executed by the basic and extended utilities, which in turn may map the routines to appropriate methods recognized by the service interface 106.

Figure 4:
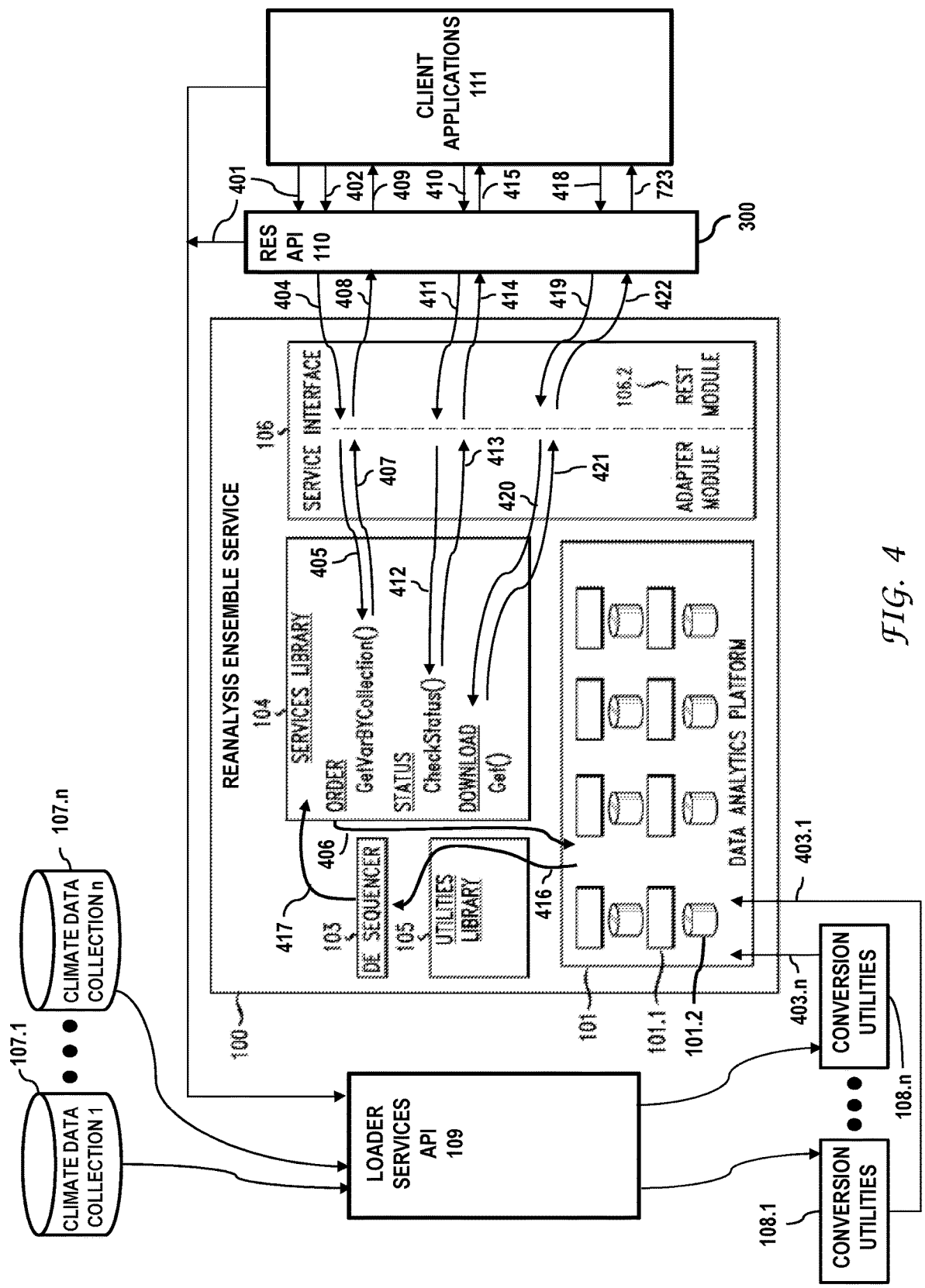
FIG. 4 illustrates a basic workflow of interactions among the components of the extended Reanalysis Ensemble Service, a loader services API 109, the Reanalysis Ensemble Service API, and client applications.

FIG. 4 illustrates a basic workflow of interactions among the components of the Reanalysis Ensemble Service 100, the loader services API 109, the Reanalysis Ensemble Service API 110, and the client applications 111. In an example client applications request for an automated multisource data provisioning operation, the client applications 111 may submit an order service request specifying data parameters 401 and operational parameters 402.

The client applications request specifying data parameters 401 may be sent directly to the loader services API 109, or indirectly through the Reanalysis Ensemble Service API 110 to the loader services API 109. As mentioned above, the data parameters may include one or more of a set of variables to retrieve, a predetermined combination of disparate climate data sources, specified temporal and spatial ranges, and any other suitable data parameters.

The request specifying operational parameters 402 may be sent to the Reanalysis Ensemble Service API 110, and may include operations to be performed on the retrieved data, a schedule for performing the operations, and any other suitable operational parameters.

In response to the client request specifying data parameters 401 sent to the loader services API 109, the loader services API 109 provides climate source data from one or more of the one or more of the disparate climate data collections, climate data collection 1-climate data collection n, to their associated conversion utilities 108.1-108.n, which transform the source data files into flat, serialized block compressed sequence files, for example, MapReduce sequence files, and loads 403.1-403.n the sequence files into the distributed file system of the data analytics platform 101, such as the Hadoop filesystem.

In response to the request specifying operational parameters 402 sent to the Reanalysis Ensemble Service API 110, the Reanalysis Ensemble Service API 110 may convert the requested operational parameters to one or more routines executed by the API 110 basic 110.1 and extended 110.2 utilities, and then may map the routines to one or more order methods 404 recognized by the service interface 106, for example, http://<base_URL>/(order.php?service=<service_name>&request=<operation>¶meters=<parameters> where the order method includes the operations to be performed on the retrieved data, a schedule for performing the operations, and any other suitable operational parameters. The service interface 106 in turn may map the request to a recognized order method 405 in the basic or extended utilities 104, in this case the GetVarByCollection( . . . ) method, which may launch 406 the operation as a MapReduce computation on the data analytic platform 101 and return 407 a session identifier (ID) through the service interface 106 which may then map the ID 408 to the order method requested by the Reanalysis Ensemble Service API 110, which in turn may map the ID 409 to the client applications order service request.

Once the order request is launched, the client applications 111 may request status information 410 which the API 110 may then map to an appropriate status order 411 recognized by the service interface 106, for example, http://<base_URL>/ (status.php?service=<service_name>&request= <operation>¶meters=<parameters>. The service interface 106 in turn may map the status order to the CheckStatus method 412 with the session ID to monitor the progress of the order request. The system interface 106 may receive the status 413, and may map the status 414 to the request submitted by the Reanalysis Ensemble Service API 110, which in turn may map the status 415 to the client applications status request.

When the order request is finished, the computed data object 416 may be desequenced by the de-sequencer 103 and the desequenced data object 417 may be converted to a NetCDF file by the services library 104 and prepared for retrieval. The client applications 111 may then submit a download request 418 to the Reanalysis Ensemble Service API 110, which the API 110 may then map to a download order 419 recognized by the service interface 106, for example, http://<base_URL>/ (download.php?service=<service_name>&request= <operation>¶meters=<parameters>. The service interface 106 may map the download order to a Get method 420. The Get method may provide the data 421 to the system interface 106 which may then map the data 422 to the Reanalysis Ensemble Service API 110, which in turn may return the data 423 to the client applications 111.

In some instances where the client applications request specifying operational parameters 402 includes a schedule for performing the operations, the Reanalysis Ensemble Service API 110 may assemble one or more routines executed by the API 110 basic 110.1 and extended 110.2 utilities, to implement the schedule. For example, the client applications request may specify that the climate source data from one or more of the one or more of the disparate climate data collections, climate data collection 1-climate data collection n, (FIG. 4) be refreshed or re-downloaded periodically over progressive temporal ranges or spatial ranges, and that the operations be performed each time the climate source data is refreshed.

The Reanalysis Ensemble Service API 110 may then, according to the schedule, send instructions to the loader services API 109 to provide the climate source data from the specified disparate climate data collections, including one or more of a set of variables to retrieve, the specified temporal and spatial ranges, and any other suitable data parameters. The Reanalysis Ensemble Service API 110 may send the instructions to the loader services API 109 as a one-time event, or periodically with the progressively changing temporal ranges.

It should be understood that the requests sent by the client applications may include more than one request with different data parameters, different operational parameters and different combinations of data and operational parameters.

Figure 5:
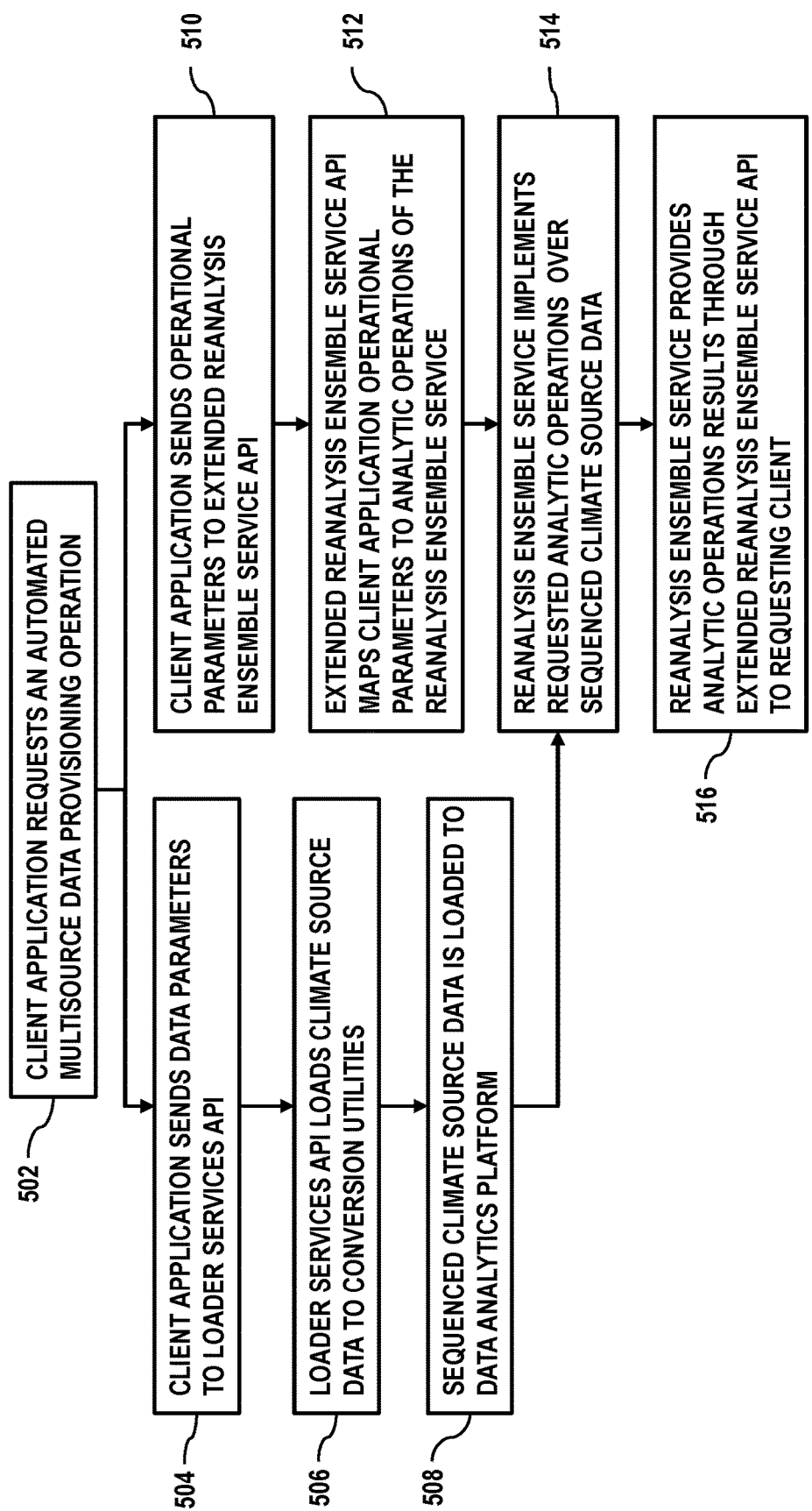
FIG. 5 depicts an exemplary method according to the disclosed embodiments.

Having disclosed some basic system components and concepts, the disclosure now turns to the exemplary method embodiment shown in FIG. 5. For the sake of clarity, the method is described in terms of an exemplary system 100 as shown in FIG. 4, configured to practice the method. The steps outlined herein are exemplary and can be implemented in any combination thereof, including combinations that exclude, add, or modify certain steps.

As shown in block 502 a client application may request an automated multisource data provisioning operation. As shown in block 504, the service request may include data parameters sent directly or indirectly to the loader services API, including one or more of a set of variables to retrieve, a predetermined combination of disparate climate data sources, specified temporal and spatial ranges, and any other suitable data parameters. As shown in block 506, the loader services API may load the data specified by the data parameters to the conversion utilities for processing and sequencing, and as shown in block 508, the sequenced climate source data is loaded to the data analytics platform.

As shown in block 510, the service request may also include operational parameters sent to the Reanalysis Ensemble Service API 110, and may include operations to be performed on the retrieved data, a schedule for performing the operations, and any other suitable operational parameters. As shown in block 512, the Reanalysis Ensemble Service API 110 maps the client application operational parameters to analytic operations of the Reanalysis Ensemble Service 100. As shown in block 514, the Reanalysis Ensemble Service 100 implements the requested analytic operations over the sequenced climate source data, and as shown in block 516, the analytic operations results are provided to the requesting client through the Reanalysis Ensemble Service API 110.

Figure 6:
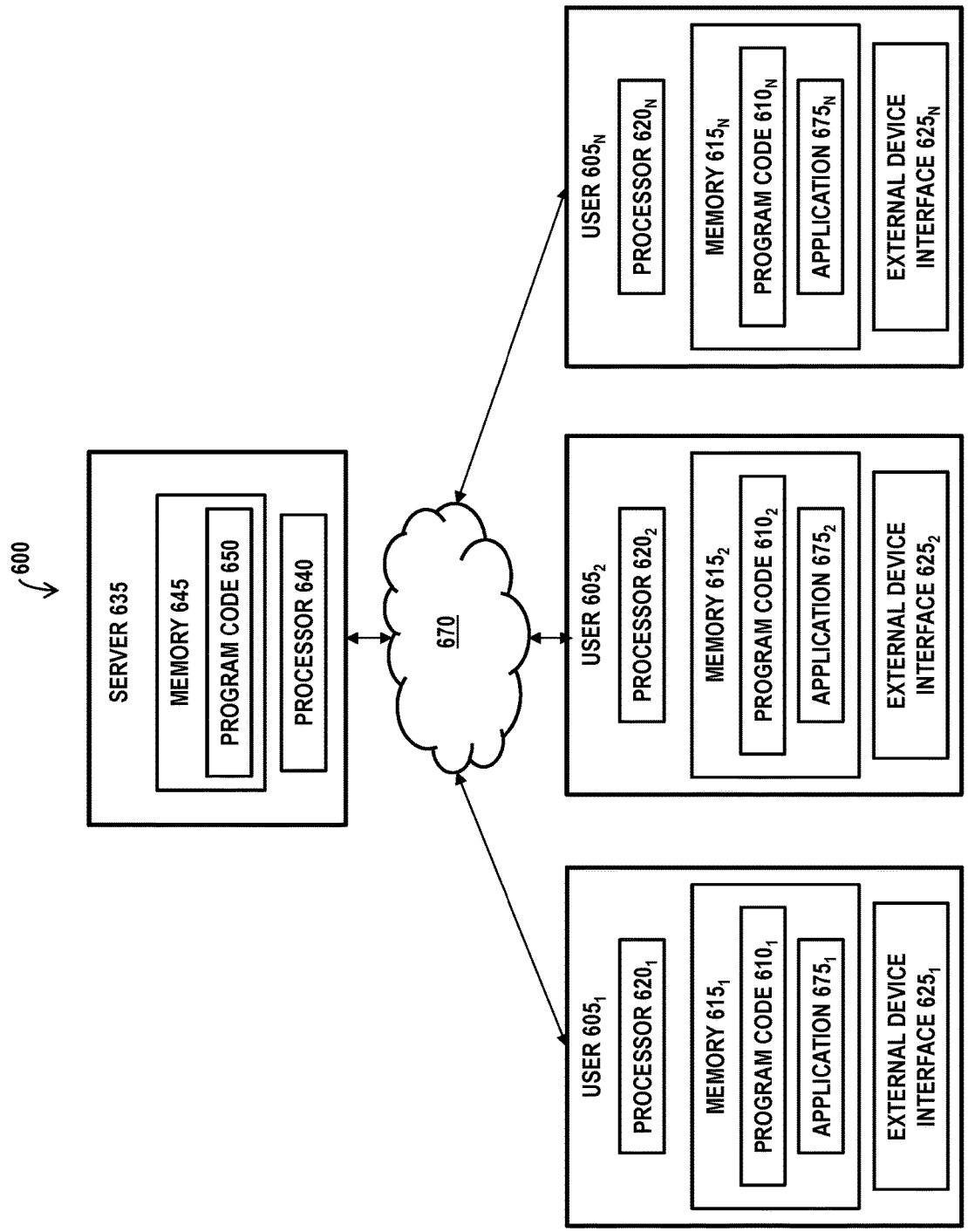
FIG. 6 shows a block diagram of a system according to the disclosed embodiments.

FIG. 6 shows a schematic illustration of an exemplary computing system 600 for practicing the disclosed embodiments. The system 600 may include one or more user terminals $605_1$-$605_n$. Each user terminal $605_1$-$605_n$ may include computer readable program code $610_1$-$610_n$ stored on at least one non-transitory computer readable medium for carrying out and executing the processes described herein. The computer readable medium may include memories $615_1$-$615_n$, and in alternate aspects, the computer readable program code $610_1$-$610_n$ may be stored in memories external to, or remote from, user terminals $605_1$-$605_n$. Memories $615_1$-$615_n$ may include magnetic media, semiconductor media, optical media, or any media which is readable and executable by a computer. Each user terminal $605_1$-$605_n$ may also include a processor $620_1$-$620_n$ for executing the computer readable program code $610_1$-$610_n$ in a sequential processing configuration. In some embodiments, each user terminal $605_1$-$605_n$ may include multiple processors $620_1$-$620_n$ for executing the computer readable program code $610_1$-$610_n$ in a parallel processing configuration.

At least one embodiment may be limited to a single autonomous user terminal 605, while other embodiments may include multiple user terminals $605_1$-$605_n$. In some embodiments, one or more of the user terminals $605_1$-$605_n$ may be connected to each other and optionally to a server 635 through a network 670. The computer readable program code $610_1$-$610_n$ of one or more of the user terminals may invoke or operate an application $675_1$-$675n$ for accessing other user terminals and the server 635.

The server 635 may include a processor 640, and memory 645 storing computer program code 650 for generally operating the server 635 to provide the computing system operations described herein. In some embodiments, the at least one server 635 may be implemented by a cloud computing service, and the processes described herein may be provided in the form of software as a service (SaaS).

The various embodiments described above are provided by way of illustration only and should not be construed to limit the scope of the disclosure. For example, the principles herein apply generally to any large, standardized data set. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. An extended reanalysis ensemble service including a special purpose computer with an assemblage of compute and storage nodes that provide a compute-storage fabric upon which high-performance parallel operations are performed over a collection of climate data stored in a distributed file system, comprising:
    a loader services application program interface (API) with a services library of applications that dynamically create data objects from data as reduced final results, and a utilities library of software applications that process flat serialized block compressed sequence files configured to:
    receive data parameters for a specified set of automated multisource data provisioning operations from an external source;
    accept climate source data from one or more predetermined disparate climate data collections specified in the data parameters to conversion utilities for transforming the climate source data into the flat, serialized block compressed sequence files;
    whereby the loader services API operates to connect externally stored climate data collections, download data from the climate data collections, sequence the data, and validate that the data has been sequenced properly and
    load the flat, serialized block compressed sequence files to a distributed file system of the extended reanalysis ensemble service; and
    a reanalysis ensemble service application program interface (API) configured to:
    receive operational parameters for the specified set of automated multisource data provisioning operations from the distributed file system;
    convert the operational parameters to one or more methods recognized by a service interface of the extended reanalysis ensemble service to be converted to analytical operations executed by the extended reanalysis ensemble service; and
    provide results of the one or more analytical operations executed by the extended reanalysis ensemble service to a client.

2. The extended reanalysis ensemble service of claim 1, wherein the operational parameters include a schedule for:
    repeating the provisioning of the climate source data, transforming the climate source data into flat, serialized block compressed sequence files, and loading of the sequence files over progressive temporal or spatial ranges; and
    repeating the conversion of the operational parameters to one or more methods recognized by the service interface and the provision of the results of the one or more analytical operations executed by the extended reanalysis ensemble service to the client.

3. The extended reanalysis ensemble service of claim 1, wherein the data parameters comprise a predetermined combination of the disparate climate data sources, a set of climate variables of the disparate climate data sources, and temporal and spatial ranges of the disparate climate data sources upon which to operate.

4. The extended reanalysis ensemble service of claim 1, wherein the disparate climate data sources comprise the NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CRv2c), Japanese 25-year Reanalysis (JRA-25), Japanese 55-year Reanalysis (JRA-55), data from NASA's Moderate Resolution Imaging Spectroradiometer (MODIS), LANDSAT image data, and NASA's Global Precipitation Climatology Project (GPCP) dataset.

5. The extended reanalysis ensemble service of claim 1, wherein the loader services API is further configured to transform the climate source data using conversion utilities configured to convert specific ones of the disparate climate data collections to common format files that are temporally and spatially registered and to transform the common format files into the flat, serialized block compressed sequence files.

6. The extended reanalysis ensemble service of claim 1, wherein the reanalysis ensemble service API comprises one or more of:
    basic utilities configured to convert the operational parameters to one or more routines comprising canonical operations and map the routines to the one or more methods recognized by the service interface of the extended reanalysis ensemble service; and
    extended utilities configured to convert the operational parameters to one or more scripts and map the scripts to the one or more method recognized by the service interface of the extended reanalysis ensemble service.

7. A method for providing an extended reanalysis ensemble service in a special purpose computer with an assemblage of compute and storage nodes that provide a compute-storage fabric upon which high-performance parallel operations are performed over a collection of climate data stored in a distributed file system, comprising:
    receiving data parameters for a specified set of automated multisource data provisioning operations;
    providing climate source data from one or more disparate climate data collections specified in the data parameters to conversion utilities and transforming the climate source data into flat, serialized block compressed sequence files based on received data parameters;

loading the sequence files to a distributed file system of the extended reanalysis ensemble service with a services library of applications that dynamically create data objects from data as reduced final results, and a utilities library of software applications that process flat serialized block compressed sequence files;

receiving operational parameters for the specified set of automated multisource data provisioning operations from an external source;

converting the operational parameters to one or more methods recognized by a service interface of the extended reanalysis ensemble service and converting the one or more methods to analytical operations executed by the extended reanalysis ensemble service; and providing results of the one or more analytical operations executed by the extended reanalysis ensemble service to a client.

8. The method of claim 7, wherein the operational parameters include a schedule for:

repeating the provisioning of the climate source data, transforming the climate source data into flat, serialized block compressed sequence files, and loading of the sequence files over progressive temporal or spatial ranges; and repeating the conversion of the operational parameters to one or more methods recognized by the service interface and the provision of the results of the one or more analytical operations executed by the extended reanalysis ensemble service to the client.

9. The method of claim 7, wherein the data parameters comprise a predetermined combination of the disparate climate data sources, a set of climate variables of the disparate climate data sources, and temporal and spatial ranges of the disparate climate data sources upon which to operate.

10. The method of claim 7, wherein the disparate climate data sources comprise the NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CRv2c), Japanese 25-year Reanalysis (JRA-25), Japanese 55-year Reanalysis (JRA-55), data from NASA's Moderate Resolution Imaging Spectroradiometer (MODIS), LANDSAT image data, and NASA's Global Precipitation Climatology Project (GPCP) dataset.

11. The method of claim 7, further comprising transforming the climate source data using conversion utilities configured to convert specific ones of the disparate climate data collections to common format files that are temporally and spatially registered and to transform the common format files into the flat, serialized block compressed sequence files.

12. The method of claim 7, further comprising one or more of:

converting the operational parameters to one or more routines comprising canonical operations executed by basic utilities of the reanalysis ensemble service API and mapping the routines to the one or more methods recognized by the service interface of the extended reanalysis ensemble service; and converting the operational parameters to one or more scripts executed by extended utilities of the reanalysis ensemble service API and mapping the scripts to the one or more method recognized by the service interface of the extended reanalysis ensemble service.

* * * * *